J. M. WILLARD.
APPARATUS FOR PRODUCING GAS FROM LIQUID HYDROCARBONS.
APPLICATION FILED MAY 7, 1908.

921,934.

Patented May 18, 1909.

Witnesses:
C. J. Williams
Julia Townsend

Inventor:
John M. Willard.
by James R. Townsend
his atty.

J. M. WILLARD.
APPARATUS FOR PRODUCING GAS FROM LIQUID HYDROCARBONS.
APPLICATION FILED MAY 7, 1908.

921,934.

Patented May 18, 1909.

Witnesses:
E. J. Williams
Julia Townsend

Inventor,
John M. Willard.
by James R. Townsend
his Atty.

J. M. WILLARD.
APPARATUS FOR PRODUCING GAS FROM LIQUID HYDROCARBONS.
APPLICATION FILED MAY 7, 1908.

921,934.

Patented May 18, 1909.

UNITED STATES PATENT OFFICE.

JOHN M. WILLARD, OF LOS ANGELES, CALIFORNIA.

APPARATUS FOR PRODUCING GAS FROM LIQUID HYDROCARBONS.

No. 921,934.      Specification of Letters Patent.      Patented May 18, 1909.

Application filed May 7, 1908. Serial No. 431,525.

*To all whom it may concern:*

Be it known that I, JOHN M. WILLARD, a citizen of the United States, residing at Los Angeles, in the county of Los Angeles and State of California, have invented a new and useful Apparatus for Producing Gas from Crude Oil and other Liquid Hydrocarbons and Oils, of which the following is a specification.

This invention is applicable for producing gas for use in internal combustion engines and for fuel, illumination, and other purposes, from crude oils of the character found in southern California and elsewhere, having an asphaltic base. It is also applicable for producing gas from oils having a paraffin base, and from other oils.

An object of the invention is to provide an apparatus whereby a maximum amount of gas for use in internal combustion engines and elsewhere may be obtained from asphaltic or other oils, in the most convenient and economical manner.

The invention is applicable for the manufacture of gas that may be stored in a gas-holder for a limited time at determined temperatures for intermittent use, and is also applicable for direct use in an internal combustion engine and elsewhere.

The invention is especially designed for the automatic production of gas as needed, so that no holder is required, the gas being produced as it is used. The production of the gas is effected by a current of air which may be supplied in some instances by a blower or air-compressor, and in other instances by suction of an engine or other device in which the gas is to be consumed.

The invention may be applied in various forms, and I do not limit the same to any specific form of apparatus.

In the accompanying drawings the invention will be illustrated in a form adapted to supply an internal combustion engine with gas from crude oil having non-volatile, tarry, or waxy constituents.

It is to be understood that the term gas as used in this specification does not necessarily refer to a fixed and permanent gas but includes such forms of vaporous or gaseous fuels as may be produced from the materials operated on by means of the apparatus described under the conditions attending such operation.

The apparatus is applicable for refining purposes as it is capable of separating volatile products from nonvolatile portions of hydrocarbon liquid, and such volatile portions may be subsequently reduced to liquid form by a suitable condensing means, illustration of which is unnecessary.

The accompanying drawings illustrate the invention.

Fig. 15 is a fragmental elevation of apparatus embodying the invention. The tar-trap omitted from the other views but preferably employed with all the forms illustrated, is shown in vertical axial section. Fragments of supports omitted from the other views are also shown in this view.

In the several views similar parts are designated by like characters accompanied in some instances by indices to distinguish the different forms. In the description notice of the indices will usually be omitted.

1 designates a container comprising an upper gasifying chamber 2 and a lower oil-well 3. The gasifying chamber may be separated from the oil-well by a transverse conical diaphragm 4 provided in its apex with an orifice 5 and forming around the walls of the container 1 a drain or gutter 6 draining into a tar well 7 which extends from the gutter to discharge outside of the container and is closed at its discharge outlet by a valve 8.

9 designates an air-pipe which may in some instances lead from an air-compressor not shown, and in other instances where suction is depended upon for the supply of air, may lead directly through heating means not shown, from the atmosphere or other air source, and discharge a current of air into the gasifying chamber 2, through an injector or spraying device 10 comprising the oil-pipe 11, the lower end of which is open and located near the bottom of the oil-well 3; said injector being directed upwardly to discharge through the orifice 5 into the gasifying chamber 2, a spray of atomized oil.

12 designates a closure in the form of a bushing around the oil-pipe 11 in the bottom of the directing chamber 14 of the air-pipe which surrounds the oil-pipe and terminates just above the same in an upwardly-directed nozzle 15, thus causing the nozzle of the injector or atomizing device to discharge the oil and air upwardly into the gasifying chamber 2.

17 designates means to supply oil to the oil-well 3. It is to be understood that said means must be of such a character as to counterbalance any pressure produced in the container 1 by any compressed air introduced through the pipe 9 in case an air-compressor is used. It is to be understood that this means shall be of such form that it will maintain a given oil level against either the pressure in case a compressor is used, or fluctuating suction in case the machine is operated by suction of an internal combustion engine.

18 designates a gas outlet leading from the upper part of the gasifying chamber.

19 is a heating chamber surrounding the oil well and a large portion of the gasifying chamber; the purpose being to heat the container 1 to cause production of the gas that is to be discharged through the gas-pipe 18. The heat for the heating chamber 19 may be supplied in any desirable manner, as for instance the introduction thereinto through a port 20 of the exhaust from an internal combustion engine, not shown, which may be supplied with fuel from the gas-pipe 18.

21 designates the exhaust port from the heating chamber 19. 22 designates baffles in the heating chamber 19 to properly direct the heating medium through said chamber.

23 designates a removable head for the gasifying chamber secured in place by bolts 24, and 25 designates a head for the heating chamber, the same being interposed between the head 23 and the top 26 of the container 1; said bolts 24 extending therethrough and into the body of the container, thus to at once secure both the heads 23 and 25 to said body.

27 designates bolts securing the head 25 of the heating chamber to the body 28 of said heating chamber which may be provided with a flange 29 for this purpose. The body 28 of the heating chamber may be symmetrically constructed, as shown, and provided with flanges 29, 29' at opposite ends. A head 25', corresponding to the head 25, may be fastened to the body 28 in a manner corresponding to that above described, and a head 23' secured thereto by bolts 24; the only difference between the heads 23 and 23' being that they are provided respectively with the requisite orifices; the head 23 being fitted to receive the gas-pipe 18, and the head 23' being adapted to receive the air-pipe 9, oil-pipe 17, the drain-pipe, the tar well 7, and in some forms an oil-overflow pipe 53.

31 designates the stand-pipe portion of the oil-supply means, the same being provided with perforations 32 to emit oil laterally and provided with a valve-seat 33 at the bottom for a puppet 34 which is connected by a connection 35 with a float 36 which is arranged to seat the puppet 34 in the valve-seat 33 whenever the oil rises to a determined level below the top of the oil-pipe 11 of the injector; the purpose being to prevent an undue flow or any leakage of oil through said oil-pipe 11.

37 designates a pressure relief valve in the oil-supply-pipe 17 to prevent excessive flow of oil therethrough in case oil is supplied by a pump.

The tar-well may comprise an auxiliary reservoir 38, and a main reservoir 39 arranged below the auxiliary reservoir and connected therewith by a valve-pipe 40 in which the valve 8 is arranged. The main reservoir 39 has an outlet 41 in the bottom closed by a closure 42 held in place by any suitable means, as the screw 43.

A removable lining wall 44 of sheet iron or other suitable material, may be inserted into the container, when the head 23 is removed, and may consist of a plain or corrugated sheet bent into sleeve form with the edges lapped so that the resiliency of the sheet will tend to hold the sheet where placed in the container, thus protecting the container within and forming a lining for the vaporizing or gasifying chamber to assist in removing certain non-liquid and non-volatile portions of the hydrocarbon that might otherwise adhere to the fixed walls of the vaporizing and gasifying chamber.

45 designates an inverted conical baffle of sheet metal or other suitable material provided at its larger end with projections 46 to extend to and rest upon the upper end of the cylinder 44, whereby the baffle may be supported at the upper end of the cylinder 44 within the container 1. Said baffle is preferably hollow and provided with perforations 47 at the upper end, and with an orifice 48 at the lower end. 49 is a valve to close the orifice 48 when suction through said orifice 48 is sufficient to lift the valve. Said valve is supported by a stem 50 held by a cross-piece 51 which is normally supported by a seat 52 in the smaller end of said baffle 45.

Figures 4, 5, 6, 7, 8, 9:
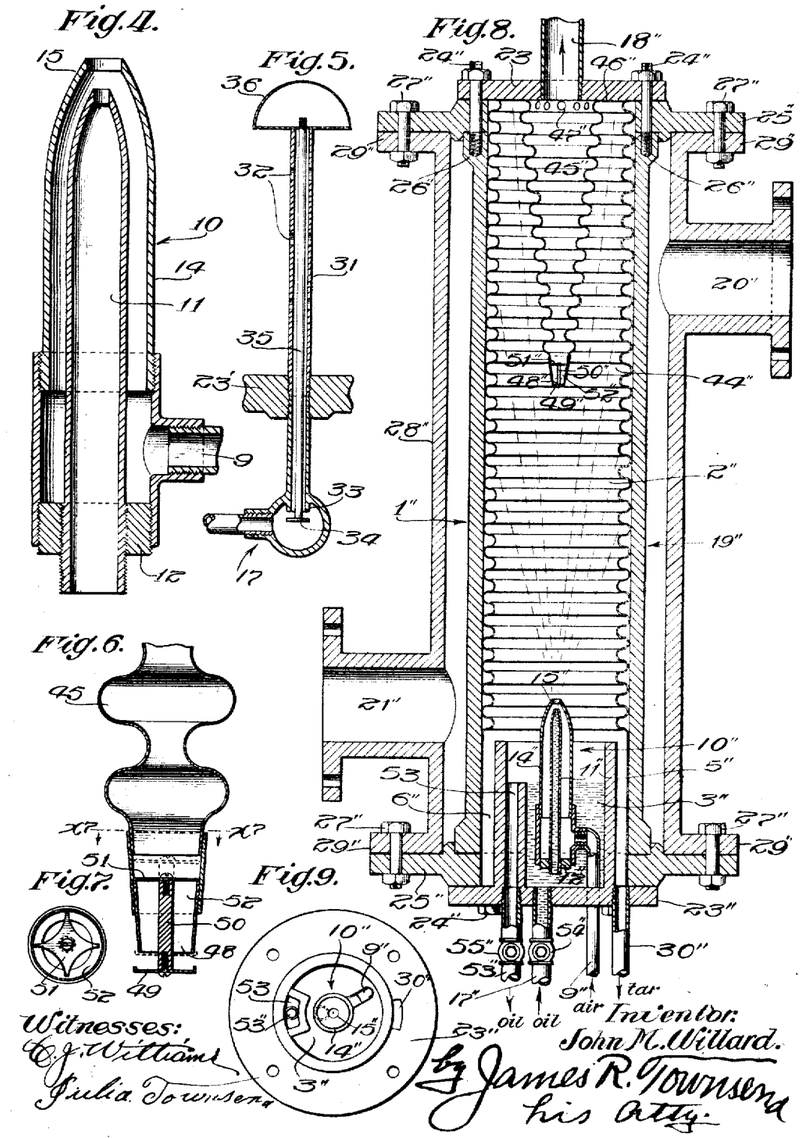
Fig. 4 is an enlarged detail in axial section, of a form of injector employed to atomize the oil.
Fig. 5 is an enlarged axial section illustrating the valve that controls the level of the oil in the oil-well shown in Fig. 2.
Fig. 6 is an enlarged, fragmental, sectional detail of the lower end of the baffle shown in Figs. 2 and 8.
Fig. 7 is a plan section on line $x^7$, Fig. 6.
Fig. 8 is an axial section illustrating another form in which the invention may be embodied.
Fig. 9 is a plan of the oil-well contrivance of Fig. 8, detached.

In the form shown in Fig. 8 the gutter 6″ extends entirely to the lower head 23″, thus dispensing with the conical diaphragm, and in this form the wall of the oil-well 3″ is vertical and the injector is arranged to discharge through the orifice 15″. The oil-well 3″ is provided with an overflow 53 to maintain the oil level at the proper height in the oil-pipe 11″ of the injector. In this form the oil-well 3″ may be cast of a single piece with the lower head 23″, said oil-well being of less diameter than the chamber of the container 1, thereby providing a gutter 6″ equal to the depth of the oil well walls. In this form the oil-supply pipe 17″ and the oil overflow pipe 53 are provided with check valves 54″, 55″, to prevent reverse flow of the oil or other medium in the intake and overflow pipes.

Figures 10, 11:
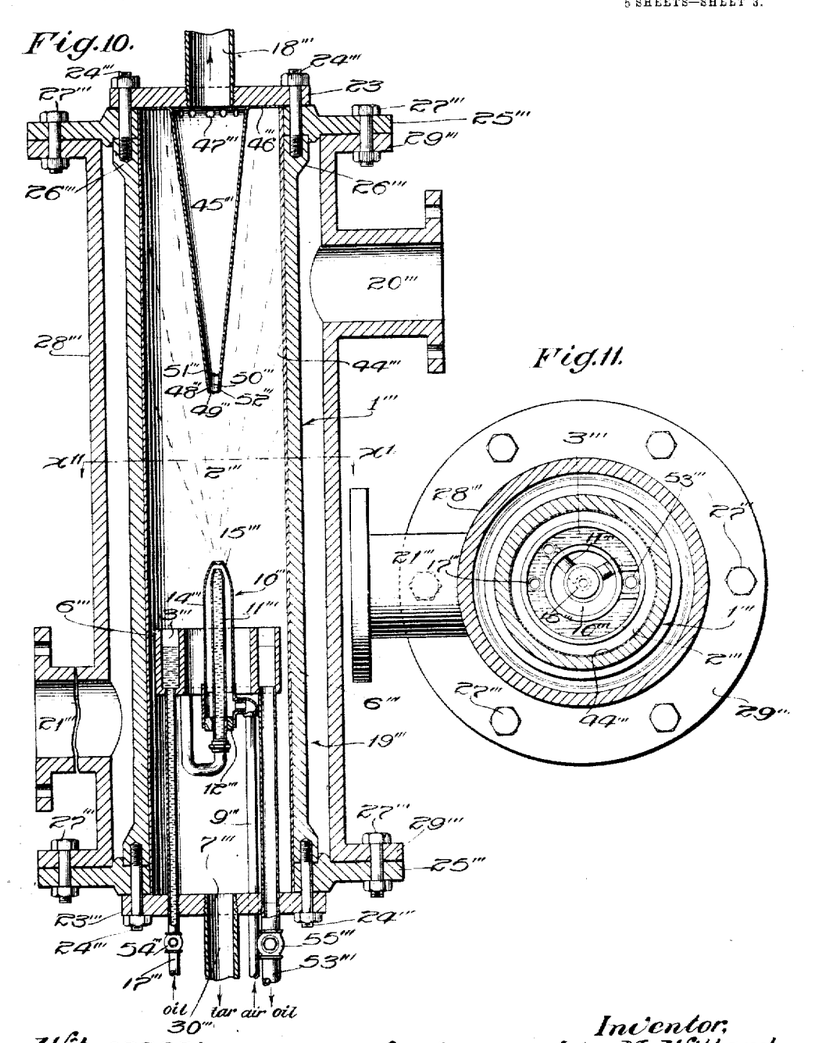
Fig. 10 is an axial section of another form more particularly designed for use with paraffin oils or other oils of light character and for machines of larger capacity than the forms shown in the preceding views.
Fig. 11 is a plan section on line $x^{11}$, Fig. 10.

In Fig. 10 a form is shown in which the oil-well 3‴ is elevated above the floor of the vaporizing or gasifying chamber 2‴. In this form the gutter space 6‴ around the oil-well 3‴ between the same and the walls of the container is an equivalent of the gutter shown in the other views, the head 23‴ serving as the bottom of such gutter to convey the tar or other residual material to the tar-well or trap 7‴. In this form the oil-well is provided with an overflow 53‴ corresponding to that shown in Fig. 8, and the pipe 11‴ is bent to bring it into the air-pipe 10‴ below the level of the oil-well floor, thus to avoid the necessity of carrying a large body of oil in the oil-well and to give sufficient length to the injector nozzles. The oil-supply pipe 17‴ and the oil overflow pipe 53‴ are provided respectively with check-valves 54‴ and 55‴ to prevent reverse flow of oil.

It is to be understood that with the forms shown in Figs. 8 and 10 the current of air is induced by the suction of an internal combustion engine. In case the air current is induced by a compressor or blower the means for maintaining the oil-level shown in Fig. 5 and described as applying to Fig. 2, would be applied to the forms shown in Figs. 8 and 10, and the oil overflows 53 and 53‴ would not be needed. It is also to be understood that the various means for maintaining the oil-level are interchangeable in the various forms of apparatus to adapt the same respectively for use with or without suction as may be required.

In the form shown in Fig. 12 the oil-well 3⁗ is elevated as in Fig. 10, and its inner wall 56 flares upwardly, and through its bottom or most constricted portion a nozzle 57 extends upwardly; the same being closed at its upper end and provided with lateral openings 58 below the top of the inner wall of the oil-well. The overflow pipe 53⁗ is connected to the nozzle 57 by a nipple 59 and is provided with an enlarged chamber 60 into which the air-pipe 9⁗ opens at 61. In this form the gutter space 6⁗ around the oil-well 3⁗ between the same and the walls of the container, is an equivalent of the gutter shown in the other views, the head 23⁗ serving as the bottom of such gutter to convey the tar or other residual material to the tar-well or trap 7⁗.

a designates an auxiliary oil reservoir supplied through a pipe b and having the level of its oil maintained by an overflow pipe c which leads to the main reservoir or source of supply, not shown.

Figures 12, 13, 14:
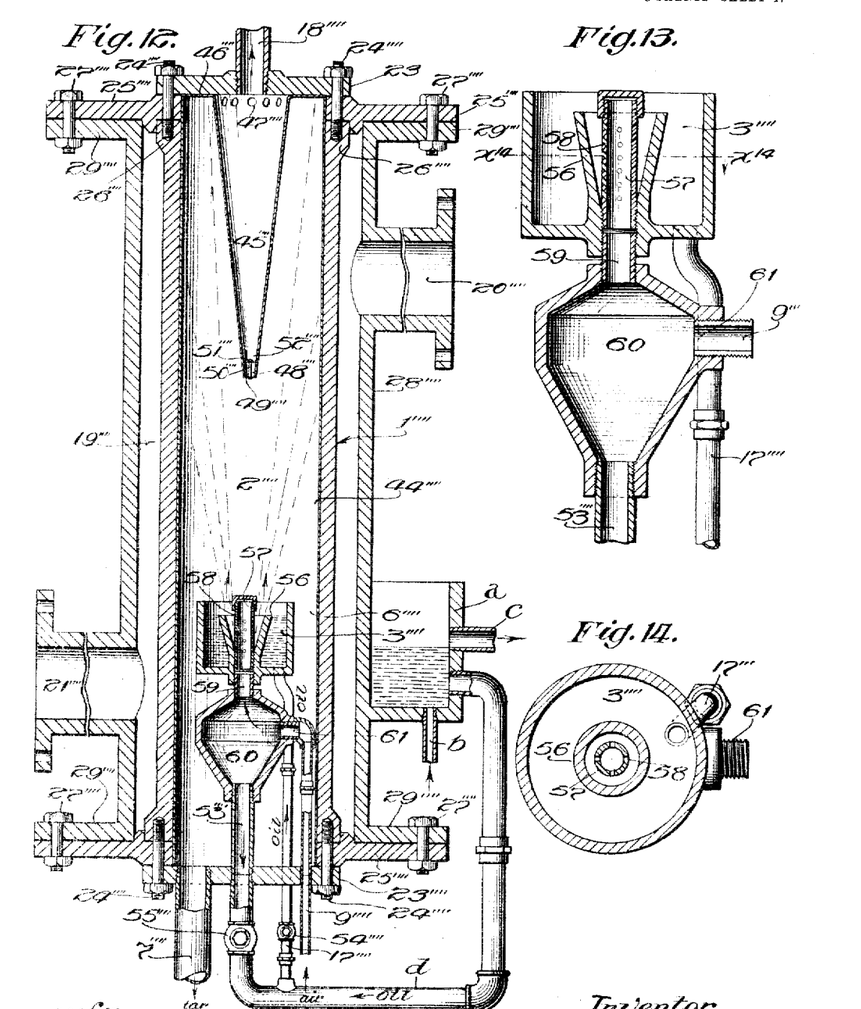
Fig. 12 is an axial section of another form of apparatus especially designed for use with paraffin oils, distillates and other light oils, and in which apparatus provision is made for circulation of oil between the injector and the oil-reservoir.
Fig. 13 is an enlarged fragmental detail of the injector and oil-circulating apparatus shown in Fig. 12.
Fig. 14 is a plan section on line $x^{14}$, Fig. 13.
Figure 15:
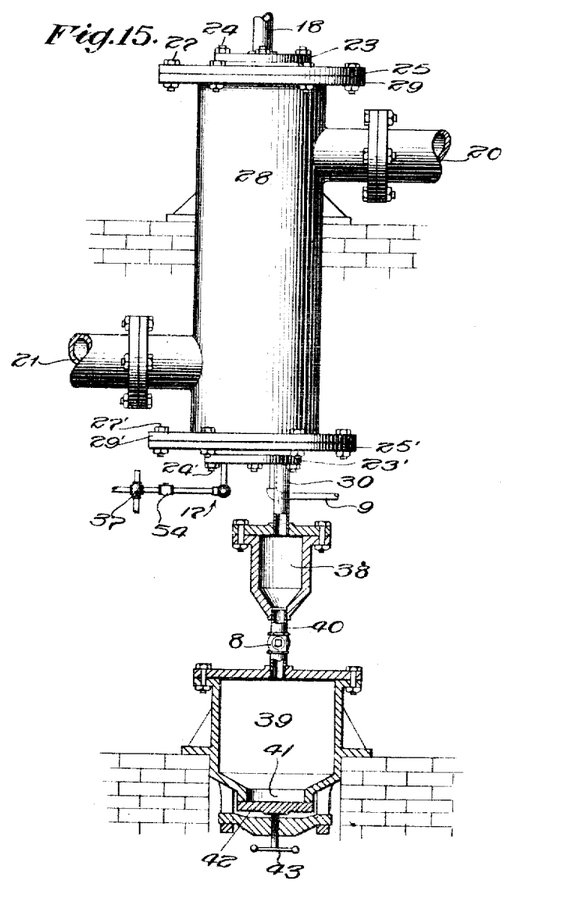

In the form shown in Fig. 12, at each suction stroke of the engine the check-valve 55⁗ closes and the suction is effective through the oil-pipe 17⁗, whose valve 54⁗ is opened by the suction to supply oil to the oil-well. When the oil has thus risen in the oil-well to the top of the inner wall thereof it overflows said wall and thence reaches the ports 58 in the nozzle 57. At each suction stroke of the engine, air is drawn through the air-pipe 9⁗ into the enlarged chamber 60 of the overflow oil-pipe 53⁗ and out through the ports 58 of the nozzle 57, taking up a portion of the oil and spraying or vaporizing the same and directing it upwardly into the gasifying chamber and to and against the walls thereof. Any surplus oil that flows over the inner wall 56 will fall through the pipe 53⁗ to the valve 55⁗ through which it may pass between the suction strokes; thence to the pipe d, where it may again be taken up by the oil-pipe 17⁗ at a succeeding suction stroke. The pipe d is constantly supplied from the auxiliary reservoir a as the gasifying operation continues.

In all of the views shown the vapor from the nozzles is directed upwardly in such a manner as to reach to, or nearly to the upper end of the gasifying chamber as well as impinging against the outside walls. In case the oil used is of light gravity so that the volatile portions of it are rapidly separated from the non-volatile, it is advisable that the nozzle be nearer the top of the gasifying chamber than in cases where heavier oils are to be vaporized.

In practical operation the current of air flows through the oil at the lower portion or bottom of the vaporizing or gasifying chamber; said oil being delivered to said current of air at the nozzle end of the oil-pipe 11 in all of the forms shown, excepting that shown in Fig. 12, and the air thus operates to throw upwardly and outwardly a spray of atomized oil which impinges eventually against the heated walls of the gasifying chamber. The spray of atomized oil is thus acted upon by the heated contents of the chamber, and also by the direct heat of the walls of the chamber, and in case heated air is used for the current of air, the heat thus carried assists in the act of gasifying the volatile portions of the oil or bringing the same to a high condition of vaporization. The non-volatile products of the oil being thus directed against the walls of the gasifying chamber, adhere thereto and flow downward therealong to the gutter or space 6 around the oil-well, and are thence conducted to the tar-trap 7. Upon striking the walls of the gasifying chamber, the oil will drain down thereupon, giving off during its course the last degree of its volatile portion so that only the non-volatile and residual portions of the oil reach the gutter around the oil-well, from whence they are drained into the tar-well 7. Certain portions of the residual matter will become dried upon the walls of the gas chamber, and by inserting a plain or corrugated sleeve, as before described, the progress of this draining oil can be retarded, giving greater opportunity for distillation, and any portions which may become dried upon the walls may be removed from time to time by removing the top head of the container and withdrawing the lining upon which these deposits have accumulated, whereupon a new lining may be inserted, the cap replaced and operation resumed with but slight loss of time.

In order to increase the heating surface of the gasifying chamber and to baffle the gases, and thus retard their passage into the gas outlet, the conical baffle, as before described, is placed in the upper part of the cylinder. On the suction stroke of an engine the valve at the tip of this cone will be closed by the upwardly-rushing gas, so that the only course for the gas in its path to the gas-outlet is through the extreme upper part of the gas chamber and through the ports 47 in the upper portion of the cone. This serves the purpose of drawing the spray or atomized oil into the uppermost parts of the chamber, so that it will have a greater distance to drain along the chamber-walls, giving increased opportunity for distillation.
Between suction strokes of the engine the valve at the tip of the cone will open, allowing any liquid which may have been drawn into the cone to escape through the opening at such tip whence it will, with drainage from the outer surface of the cone, drop into the upwardly-rushing spray and be thrown onto the walls of the gas chamber for final distillation and delivery of its residual products into the tar-well.
In practical use with any form of the apparatus the flow of oil into the oil-well 3 may be induced either by the suction of an internal combustion engine, or by action of gravity, or by the operation of a pump.
When supplying gas to an engine the piston of the engine acts as a pump, and on its suction stroke causes a vacuum in the gas chamber 2 which causes check-valve 54 to open, allowing an inrush of oil; and also check-valve as at 55'' to close, thus preventing back flow of oil.

Figures 1, 2, 3:
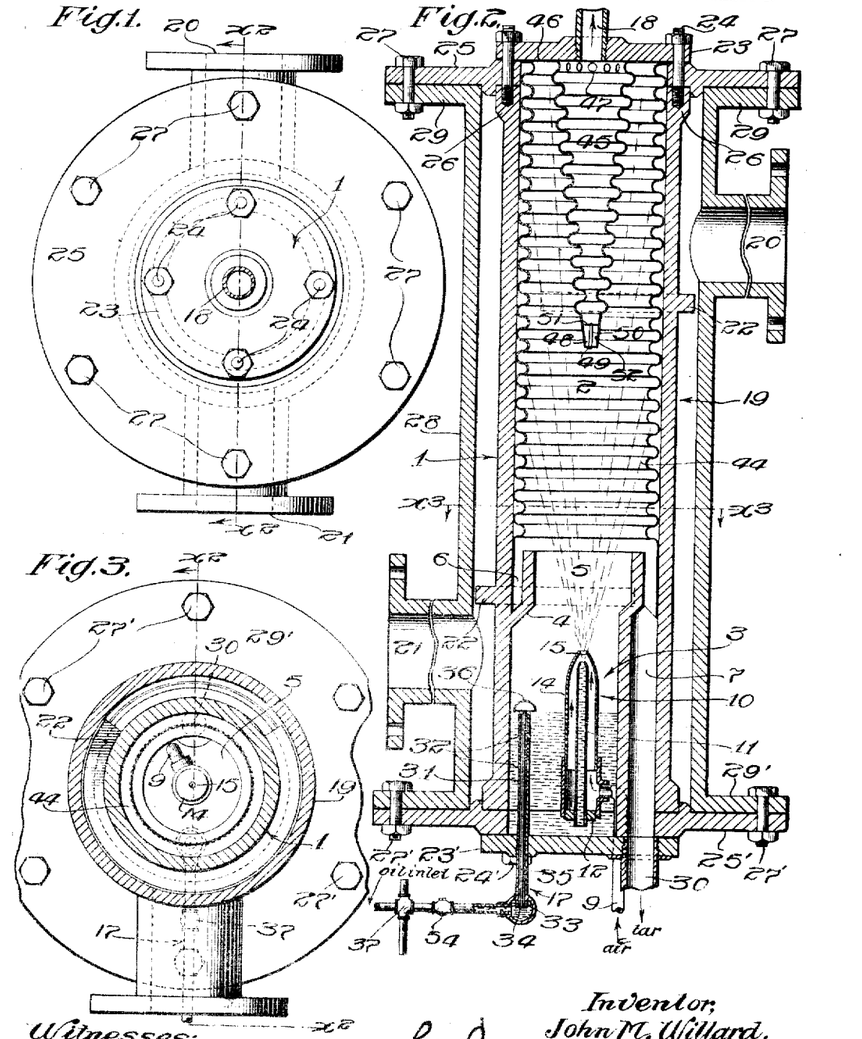
Figure 1 is a fragmental plan of the apparatus omitting any mechanism that may be employed for inducing the air current and for supplying the oil, and also omitting the tar-trap shown in Fig. 15. The pipe connections are broken.
Fig. 2 is a fragmental axial section on line indicated by $x^2$, Fig. 1, of one form of apparatus embodying this invention.
Fig. 3 is a fragmental plan section on line $x^3$, Fig. 2.

In the form of valve shown in Figs. 2 and 5 the float 36 will seat the valve 34 against its seat 33 whenever the oil reaches the determined level; but when a float-valve is not used an over-flow, as at 53 must be provided, and in such case the check-valve as at 55'' will open between the suction strokes, thus allowing the surplus oil to overflow through 53 and to return to the reservoir.

When a float-valve is used, a power-driven supply pump, not shown, may be used, with the apparatus running either under pressure or suction, and in that case the pressure-relief-valve 37 must be placed in the oil-supply-pipe between the pump and the float-valve to allow escape of oil in case the float-valve closes.

It is to be understood that the term non-volatile as used in this specification is intended to refer to the elements which do not become volatilized in the operation of the apparatus.

I claim:—

1. An apparatus for vaporizing hydrocarbon liquid comprising a vaporizing or gasifying chamber, means to heat the chamber, means to spray hydrocarbon upwardly and outwardly through the chamber to the walls thereof, means to maintain in the chamber, a supply of hydrocarbon with its top surface below the outlet of the spraying means, means to emit gas or vapor from the chamber, means to collect residue from the walls, and means to discharge the same from the chamber.

2. An apparatus for vaporizing hydrocarbon liquid, comprising a vaporizing or gasifying chamber having upright walls, means to heat said walls, means to spray hydrocarbon upwardly through the chamber to and against said walls, means to maintain in the chamber a supply of hydrocarbon with its top surface below the outlet of the spraying means, means to emit gas or vapor from the chamber, means to collect residue from said walls, and means to discharge the same from the chamber.

3. An apparatus for vaporizing hydrocarbon liquid comprising a vaporizing or gasifying chamber having upright corrugated walls, means to heat said walls, means to spray hydrocarbon upwardly and outwardly through the chamber to said walls, means to emit gas or vapor from the chamber, means to collect residue from the walls, and means to discharge the same from the chamber.

4. An apparatus for vaporizing hydrocarbon liquid comprising a vaporizing or gasifying chamber having upright walls, a hollow baffle extending downwardly into the chamber, means to spray hydrocarbon upwardly through the chamber between the baffle and the walls of the chamber and to and against said walls and baffle, means to heat the walls of the chamber, means being provided to allow gas or vapor to pass from the chamber into the baffle, means to drain residue from the interior of the baffle, means to emit gas or vapor from within the baffle, means to collect residue from the walls of the chamber, and means to discharge such residue from the chamber.

5. An apparatus for vaporizing hydrocarbon liquid comprising a vaporizing or gasifying chamber having upright walls, a hollow inverted conical baffle extending downwardly into the chamber and provided with ports at its upper and lower ends, and a drain valve for the lower port, means to heat the walls of the chamber, means to spray hydrocarbon upwardly through the chamber, and into the space between said baffle and the walls of the chamber and against the baffle and the walls of the chamber, means to emit gas or vapor from within the baffle, and means to collect and remove residue from the walls of the chamber.

6. The combination with a vaporizing or gasifying chamber, of means to heat the walls of said chamber, a well to hold a body of hydrocarbon in said chamber for heating such body, means to supply hydrocarbon to said well, upwardly directed means arranged to receive heated hydrocarbon from said body and extending above the level of the hydrocarbon, and to spray the same upwardly through said chamber to and against the walls of the chamber, means to emit gas or vapor from the chamber, means outside said well to collect residue from the walls of said chamber, and means to discharge said residue from said chamber.

7. An apparatus for vaporizing hydrocarbon liquid, comprising a heating chamber having inlet and exhaust ports, a vaporizing or gasifying chamber within said heating chamber, means to supply hydrocarbon liquid into the bottom of said gasifying chamber, upwardly-directed means extending above the level of said liquid to project a current of heated air upwardly to carry the hydrocarbon fluid from the bottom of said gasifying chamber, to and against the walls of said chamber, means to collect and remove from said gasifying chamber the non-volatile portions of said liquid, and means to discharge gas from the gasifying chamber.

8. An apparatus for vaporizing hydrocarbon liquid, comprising a heating chamber, a vaporizing or gasifying chamber within said heating chamber, means to supply hydrocarbon liquid into the bottom of said gasifying chamber, an upwardly-directed injector or spraying device extending above the level of said liquid, to project a current of heated air upwardly through the hydrocarbon liquid in the bottom of said gasifying chamber, means to collect and remove from said gasifying chamber the non-volatile portions of said liquid, and means to discharge gas from the gasifying chamber.

9. The combination with an oil well, of a vaporizing or gasifying chamber thereabove, an injector having an open end in the oil well with its outlet above the oil level and arranged to discharge oil upwardly into the gasifying chamber, an air pipe to supply a current of air to the injector, means to supply oil to the oil well, means to discharge gas from the gasifying chamber, means for heating the oil well and gasifying chamber, and means to collect and remove from said gasifying chamber the non-volatile portions of said oil.

10. An apparatus for vaporizing hydrocarbon liquid comprising a vaporizing or gasifying chamber having upright cylindrical walls, means for heating said walls, means for spraying hydrocarbon upwardly through the contents of said chamber to and against said walls, means to emit gas or vapor from said chamber, means to collect residue from said walls, and means to remove the same from the chamber.

11. Two cylinders, one within the other to form a central chamber surrounded by an annular chamber, means to supply a heating medium to the annular chamber to heat the central chamber, means to spray hydrocarbon upwardly through the contents of the central chamber and against the upright walls of said chamber, means to emit gas or vapor from the central chamber, means to collect residue from said walls, and means to discharge the same from said chamber.

12. An apparatus for vaporizing hydrocarbon liquid comprising two chambers one surrounding the other, means to supply a heating medium to the outer chamber to heat the inner chamber, an oil well in said inner chamber, means to supply hydrocarbon to the oil well, an upwardly directed nozzle adapted and arranged to receive a supply of hydrocarbon from said oil well, means to supply a current of air to said nozzle, to spray said oil upwardly and outwardly against the walls of the inner chamber, means to discharge gas from the inner chamber, means outside the well to collect residue from the walls of the chamber, and means to discharge the said residue from the chamber.

13. An apparatus for producing gas from crude oil and the like comprising a container divided into an upper vaporizing or gasifying chamber and a lower oil-well, by a transverse conical diaphragm provided in its apex with an orifice and forming around the walls of the container a gutter, means for draining the gutter, means for closing the draining means, an injector having an open end in the oil-well and being directed upwardly to discharge through the diaphragm upwardly into the gasifying chamber, means to supply a current of air to the injector nozzle, means to supply oil to the oil-well, and means to discharge gas from said chamber.

14. An apparatus for producing gas from crude oil and the like, comprising a container divided into an upper vaporizing or gasifying chamber and a lower oil-well, by a transverse conical diaphragm provided in its apex with an orifice and forming around the walls of the container a gutter, means for draining the gutter, means for closing the draining means, an injector having an open end in the oil-well and being directed upwardly to discharge through the orifice into the gasifying chamber, means to supply a current of air to the injector nozzle, means to supply oil to the oil-well, and means for heating the oil-well and gasifying chamber.

15. The combination with an oil-well, of a vaporizing or gasifying chamber thereabove, a gutter arranged around an orifice and against the walls of said chamber, between the oil-well and the gasifying chamber, an injector having an open end in the oil-well and arranged to discharge oil upwardly through the orifice into the gasifying chamber, means to supply a current of air to the injector, means to supply oil to the oil-well, means to drain the gutter, means to discharge gas from the gasifying chamber, and means for heating the gasifying chamber.

16. The combination with an oil-well, of a vaporizing or gasifying chamber thereabove, a gutter between the oil-well and the gasifying chamber, arranged against the walls of said chamber and around an orifice, an injector having an open end in the oil-well and arranged to discharge oil upwardly through the orifice into the gasifying chamber, means to supply a current of air to the injector, means to supply oil to the oil-well, means to drain the gutter, means to discharge gas from the gasifying chamber, and means for heating the oil-well and gasifying chamber.

17. In an apparatus for vaporizing hydrocarbon liquids in which the vaporizing chamber is contained within the heating chamber, means to remove the non-liquid and non-volatile portion of said liquid from the vaporizing chamber comprising a removable protecting cylinder within and forming a lining for the vaporizing chamber substantially as described herein.

18. An apparatus for vaporizing hydrocarbon liquid comprising a vaporizing or gasifying chamber having upright walls, a baffle extending downwardly into the chamber, means to spray hydrocarbon upward through the chamber between the baffle and the walls of the chamber and to and against said walls and baffle, means to heat the walls of the chamber, means being provided to allow gas or vapor to pass into the baffle, means to drain residue from the interior of the baffle, means to emit gas or vapor from within the baffle, means to collect residue from the walls of the chamber, and means to discharge such residue from the chamber.

19. An apparatus for vaporizing hydrocarbon liquid comprising a vaporizing or gasifying chamber having upright walls, a hollow inverted conical baffle extending downwardly into the chamber and provided with ports at its upper and lower ends, means to heat the walls of the chamber, means to spray hydrocarbon upwardly through the chamber and into the space between said baffle and the walls of the chamber and against the baffle and the walls of the chamber, means to emit gas or vapor from within the baffle, and means to collect and remove residue from the walls of the chamber.

20. The combination with a vaporizing or gasifying chamber, of means to heat the walls of the chamber, a hollow baffle extending downwardly into the chamber, a well to hold a body of hydrocarbon in said chamber for heating such body, means to supply hydrocarbon to said well, upwardly-directed means arranged to receive heated hydrocarbon from said body and to spray the same through said chamber between the baffle and the walls of the chamber and to and against said walls and baffle, means to emit gas or vapor from the chamber, means outside said well to collect residue from the walls of said chamber, and means to discharge said residue from said chamber.

21. The combination with a vaporizing or gasifying chamber, of means to heat the walls of said chamber, a hollow inverted conical baffle extending downwardly into the chamber and provided with ports at its upper and lower ends and a drain valve for the lower port, a well to hold a body of hydrocarbon in said chamber for heating such body, means to supply hydrocarbon to said well, upwardly-directed means arranged to receive heated hydrocarbon from said body, and to spray the same upwardly through the chamber to and against the walls of the chamber, means to emit gas or vapor from the baffle, means outside said well to collect residue from the walls of said chamber, and means to discharge said residue from said chamber.

22. The combination with a vaporizing or gasifying chamber, of means to heat the walls of said chamber, a hollow inverted conical baffle extending downwardly into the chamber and provided with ports at its upper and lower ends, a well to hold a body of hydrocarbon in said chamber for heating such body, means to supply hydrocarbon to said well, upwardly-directed means arranged to receive heated hydrocarbon from said body and to spray the same upwardly through the chamber to and against the walls of the chamber, means to emit gas or vapor from the baffle, means outside said well to collect residue from the walls of said chamber, and means to discharge said residue from said chamber.

23. An apparatus for vaporizing hydrocarbon liquid comprising a vaporizing or gasifying chamber having upright walls, a baffle extending downwardly into the chamber, means to spray hydrocarbon upwardly through the chamber between the baffle and the walls of the chamber and to and against said walls and baffle, means to heat the chamber, means to emit gas from the chamber, means to collect residue from the walls of the chamber, and means to discharge such residue from the chamber.

24. The combination with a vaporizing or gasifying chamber, of means to heat the walls of said chamber, a hollow baffle extending downwardly into the chamber, a well to hold a body of hydrocarbon in said chamber for heating such body, means to supply hydrocarbon to said well, upwardly-directed means arranged to receive heated hydrocarbon from said body and to spray the same upwardly through said chamber between the baffle and the walls of the chamber and to and against said walls and baffle, means to allow the gas or vapor to pass from the chamber into the baffle, means to emit gas from the baffle, means outside said well to collect residue from the walls of the chamber, and means to discharge said residue from said chamber.

25. The combination with an oil well, of a vaporizing or gasifying chamber thereabove, a gutter between the walls of the oil-well and the gasifying chamber arranged against the walls of said chamber and around an orifice, an injector having an open end in the oil-well and arranged to discharge oil upwardly from the orifice into the gasifying chamber, means to supply a current of air to the injector, means to supply oil to the oil-well, means to drain the gutter, means to discharge gas from the gasifying chamber, and means for heating the oil-well and the gasifying chamber.

In testimony whereof, I have hereunto set my hand at Los Angeles, California, this 27th day of April, 1908.

J. M. WILLARD.

In presence of—
   JAMES R. TOWNSEND,
   M. BEULAH TOWNSEND.